Patented Feb. 27, 1940

2,191,794

UNITED STATES PATENT OFFICE 2,191,794

RECOVERY OF MOLYBDENUM

Hans Käding, Leuna, Germany, assignor, by mesne assignments, to I. G. Farbenindustrie Aktiengesellschaft, Frankfort - on - the - Main, Germany, a corporation of Germany No Drawing. Application June 25, 1937, Serial No. 150,264. In Germany June 27, 1936

10 Claims. (Cl. 23—22)

The present invention relates to improvements in the recovery of molybdenum from liquids containing the same.

In the production of molybdenum from its ores and in the recovery of molybdenum from materials containing the same such as, for example, spent catalysts, solutions containing molybdenum are sometimes obtained in which the molybdenum is present in a very small concentration.

It has already been proposed to precipitate as sulphide the molybdenum from such dilute solutions and then either to convert the precipitate into an oxide soluble in alkaline liquors such as aqueous ammonia or aqueous solutions of alkali metal hydroxides by mild roasting in a current of air, or directly to dissolve the precipitated sulphide in inorganic acids, for example sulphuric acid. The precipitation of the insoluble sulphide of molybdenum takes place practically quantitatively, but due to its very fine state of division the separation of the precipitate from the liquid usually is difficult. An after-treatment, which is suitably carried out by heating, is always necessary in such cases and may require several days, in order to convert the finely divided sulphide of molybdenum into grains which are sufficiently coarse so that they may conveniently be separated from the liquid by filtration or sedimentation.

I have now found that molybdenum is practically quantitatively recovered even from very dilute solutions, while avoiding the above indicated disadvantages, if the liquid containing molybdenum is intimately contacted for some time with lead sulphate, and if the solids are then mechanically separated from the liquid.

The intimate contact is suitably realized by stirring the warm or hot liquids with lead sulphate which preferably is employed in a state of fine division.

The dissolved molybdenum precipitates comparatively quickly onto the suspended lead sulphate. The time necessary for effecting the precipitation chiefly depends on the fineness of the grains of the lead sulphate and of the intensity of the stirring and may be shortened by heating.

The mechanical separation may be carried out, for example, by centrifuging or filtration, but usually it is sufficient to leave the lead sulphate charged with molybdenum sedimentate and to draw off the sedimentated solids.

The lead sulphate need not be freshly prepared. Commercial lead sulphate may be employed provided its grains are fine enough. It may be repeatedly reemployed and need not be entirely freed from the molybdenum precipitated thereon before being re-used. It is also possible to produce the lead sulphate in the liquid containing molybdenum by adding thereto a soluble lead salt, for example lead chloride or nitrate, and sulphuric acid.

It is usually advisable to employ an amount of lead sulphate corresponding to from 5 to 10 times the weight or more of the molybdenum present in the liquid. A practically complete recovery of the molybdenum is generally obtained with less than 10 times its amount of lead sulphate; sometimes 5 times its amount is sufficient and in some cases even less than 5 times.

The precipitation is advantageously carried out after adjusting the hydrogen ion concentration in the liquid to a pH of 3 up to 6. The precipitation may, however, also be carried out at higher or lower concentrations, for example at a pH of 2.5 or 7.5.

The liquids which are treated in accordance with my present invention often are weakly alkaline, for example, in case they are obtained by extraction, by means of solutions of ammonium carbonate at an elevated temperature under pressure, of spent catalysts which have served in the destructive hydrogenation of coals or tars and of which at least the greater part of the carbonaceous substances admixed therewith has been gasified or burnt out at a temperature above 600° C. The desired hydrogen ion concentration is preferably obtained by the addition of sulphuric acid. The solubility of the lead sulphate is then considerably reduced by the presence of free sulphate ions in the liquid. Losses of lead sulphate are in this way minimized to an extent such that they are practically negligible. The precipitating action of the lead sulphate on the dissolved molybdenum is not impaired in any substantial degree, provided the sulphate ions are present in the liquid in an amount not exceeding 2 grams per litre.

If the concentration of ammonium sulphate in the solution is higher, as it may sometimes occur, for example, with liquids obtained by working up spent catalysts according to the above-mentioned process the precipitation in accordance with my invention is preferably carried out after addition of ammonium carbonate. Such an addition may, of course, be dispensed with if the liquids already contain enough ammonium carbonate. It is advantageous to have at least 5 grams of ammonium carbonate per litre of liquid.

The separation of the lead sulphate charged with molybdenum from the liquid takes place quickly and extensively by simple sedimentation as soon as the stirring is stopped. The presence of sulphate ions in excess exerts a favorable influence on the speed of the sedimentation.

It is often advantageous to employ the sedimentated lead sulphate which is already charged with molybdenum for further precipitations before it is worked up. This is suitably carried out in the following manner: Fresh lead sulphate is employed for treating a portion of liquid nearly exhausted by repeated treatments; the lead sulphate thus charged with some molybdenum is then contacted with a portion of liquid which has already been treated once with lead sulphate; the lead sulphate which in this way becomes charged with more molybdenum is contacted with fresh liquid, whereas the portion of liquid which is thus partly exhausted is treated with lead sulphate which has served for one treatment. In this way fresh lead sulphate is employed for treating nearly exhausted liquid, whereas fresh liquid is treated with lead sulphate already charged with a comparatively large proportion of molybdenum. By working in this manner the liquid is gradually entirely freed from molybdenum whereas the lead sulphate is gradually charged with up to 20 per cent by weight or more of molybdenum.

The molybdenum is recovered from the lead sulphate, for example, by a treatment with sulphuric acid, of say, 10 to 50 per cent strength. Sulphuric acid of greater or lesser strength may, however, also be employed. Solutions of molybdenum in sulphuric acid are thus obtained which may be directly employed for impregnating coal or other solid carbonaceous materials which are to be subjected to catalytic destructive hydrogenation. It is not necessary entirely to remove the molybdenum from the lead sulphate since the sulphate may be employed in accordance with my process also when it is charged with a certain amount of molybdenum, as shown above. The solution of molybdenum in sulphuric acid may, if desired or necessary, be enriched in molybdenum by using it successively for treating several batches of lead sulphate charged with molybdenum.

The following examples will further illustrate how the present invention is carried out in practice but the invention is not limited to said examples.

*Example 1*

Molybdenum containing residues resulting from the destructive hydrogenation of brown coal with molybdenum containing catalysts, after having been freed from oil, are burnt out at a temperature of about 1000° C. in order to remove the carbonaceous substances contained therein. The mass is then heated to 140° C. together with double amount of its weight of a 48 per cent solution of ammonium carbonate. The liquor thus obtained which contains per litre 1 gram of molybdenum and 1.8 grams of ammonium sulphate is boiled up and such an amount of sulphuric acid is then added thereto that the pH of the liquid is 4.2. 10 grams of moist, precipitated lead sulphate are added to each litre of the warm liquid and the whole is energetically stirred for 5 minutes. The suspension is then brought into a sedimentating vessel having a conical bottom where it remains 15 minutes, the sedimentated lead sulphate being then withdrawn from the bottom of the vessel.

The sedimentate is charged with 99 per cent by weight of the molybdenum originally contained in the liquid. It is repeatedly washed by levigation with water and decantation and, while still in the moist state, it is brought into its own weight of sulphuric acid of 50 per cent strength, the mixture being then heated up for a short time. The lead sulphate is separated by sedimentation, washed with a little water and used again for a fresh precipitation of molybdenum.

The sulphuric acid containing molybdenum may be repeatedly used for treating other portions of lead sulphate charged with molybdenum, in order to increase its content of molybdenum.

*Example 2*

8 grams of finely ground, commercial lead sulphate is added to each litre of a liquid containing per litre 1.5 grams of molybdenum in the form of ammonium molybdate, 18 grams of ammonium carbonate and 140 grams of ammonium sulphate which liquid has a pH of 7.8 and has been obtained by treating spent molybdenum containing catalysts as described in Example 1. The mixture is energetically stirred for 10 minutes and then further treated as described in Example 1, the liquid remaining after sedimentation of the lead sulphate being worked up to solid ammonium sulphate. The sedimentate is charged with 98 per cent by weight of the molybdenum originally contained in the solution.

What I claim is:

1. A process for the recovery of molybdenum from liquids containing the same, which comprises adjusting the hydrogen ion concentration in the liquid to a pH of about 2.5 to 7.5, intimately contacting the liquid for some time with lead sulphate, and then mechanically separating the solids from the liquid.

2. A process for the recovery of molybdenum from liquids containing the same, which comprises adjusting the hydrogen ion concentration in the liquid to a pH of about 2.5 to 7.5, stirring the liquid at an elevated temperature with lead sulphate, and then mechanically separating the solids from the liquid.

3. A process for the recovery of molybdenum from liquids containing the same, which comprises adjusting the hydrogen ion concentration in the liquid to a pH of about 2.5 to 7.5, stirring the liquid at an elevated temperature with lead sulphate in a state of fine division, and then mechanically separating the solids from the liquid.

4. A process for the recovery of molybdenum from liquids containing the same, which comprises adjusting the hydrogen ion concentration in the liquid to a pH of about 2.5 to 7.5, stirring the liquid at an elevated temperature with lead sulphate, then allowing the solids to sedimentate and withdrawing the sedimentated solids from the liquid.

5. A process for the recovery of molybdenum from liquids containing the same, which comprises adjusting the hydrogen ion concentration in the liquid to a pH of about 2.5 to 7.5, stirring the liquid at an elevated temperature with lead sulphate in an amount corresponding to from 5 to 10 times the weight of the molybdenum present in the liquid, and then mechanically separating the solids from the liquid.

6. A process for the recovery of molybdenum from liquids containing the same, which comprises adjusting the hydrogen ion concentration in the liquid to a pH of about 2.5 to 7.5, stirring the liquid at an elevated temperature with lead sulphate while providing in the liquid sulphate ions in an amount not exceeding 2 grams per litre of liquid, and then mechanically separating the solids from the liquid.

7. A process for the recovery of molybdenum from liquids containing the same and substantial amounts of ammonium sulphate, which comprises adding to the liquid ammonium carbonate in such amounts that each litre of the liquid contains at least about 5 grams thereof, stirring the liquid at an elevated temperature with lead sulphate, and then mechanically separating the solids from the liquid.

8. In the process as claimed in claim 1, employing fresh lead sulphate for treating liquids nearly exhausted in molybdenum, and treating fresh liquids with lead sulphate already charged with molybdenum.

9. A process for the recovery of molybdenum from liquids containing the same, which comprises adjusting the hydrogen ion concentration in the liquid to a pH of about 2.5 to 7.5, intimately contacting the liquid for some time with lead sulphate, then mechanically separating the solids from the liquid and drawing the molybdenum from the lead sulphate charged therewith by a treatment with sulphuric acid.

10. In the process as claimed in claim 9 enriching in molybdenum the sulphuric acid solution of molybdenum, by using it successively for the treatment of several batches of lead sulphate charged with molybdenum.

HANS KÄDING.